J. SCHWARZ.

CURTAIN FOR KNEE TROUSERS.

APPLICATION FILED MAY 14, 1915.

Reissued June 22, 1915.

13,936.

WITNESSES

George De Bon

John A. Schlenhert

INVENTOR

JULIUS SCHWARZ

BY

Bicker & Knauth

ATTORNEYS

THE NORRIS PETERS CO., PHOTO-LITHO., WASHINGTON, D. C.

UNITED STATES PATENT OFFICE.

JULIUS SCHWARZ, OF NEW YORK, N. Y.

CURTAIN FOR KNEE-TROUSERS.

13,936. Specification of Reissued Letters Patent. Reissued June 22, 1915.

Original No. 1,132,040, dated March 16, 1915, Serial No. 668,652. Application for reissue filed May 14, 1915. Serial No. 28,196.

*To all whom it may concern:*

Be it known that I, JULIUS SCHWARZ, a citizen of the United States, and a resident of the borough of Brooklyn, county of Kings, city and State of New York, have invented certain new and useful Improvements in Curtains for Knee-Trousers, of which the following is a specification.

My invention relates to the bands used mainly for finishing the upper edge portion of knee trousers and technically known as curtains for knee trousers and has for its object to construct such curtains in a finished state and with an attaching portion by means of which the one edge portion of the curtain may be readily attached to the garment.

A further object of my improvement is to arrange said attaching portion so that the same becomes invisible after the curtain is completely secured to the garment.

A still further object of my improvement is to provide a construction in which means for guiding the presser foot of a sewing machine adjacent to that edge of the curtain which is opposite to the attaching portion above mentioned is incorporated so that when fully attached the exposed rows of stitching will all be substantially regular and in predetermined lines thus giving a highly finished appearance to the garment.

Other objects of my invention will appear from the description hereinafter and the feature of novelty will be pointed out in the appended claims.

Reference is to be had to the accompanying drawings in which—

Figure 1:
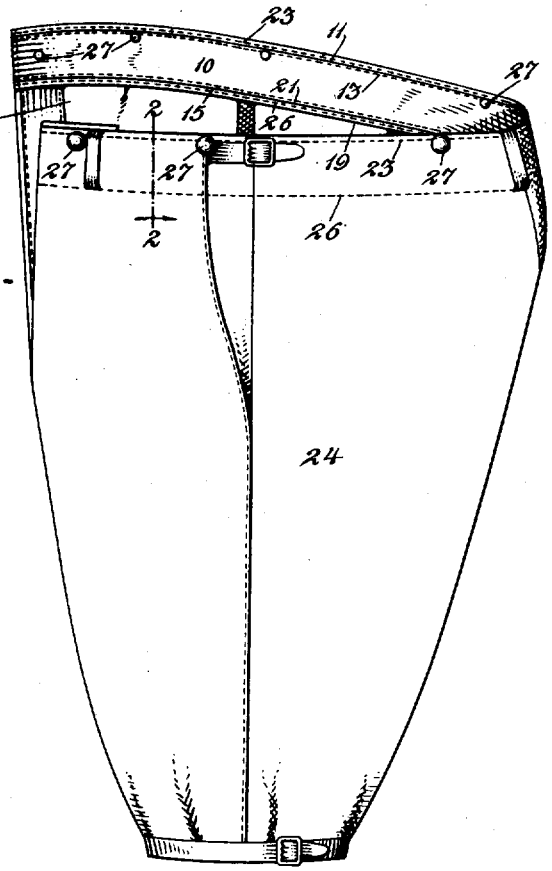
Figure 2:
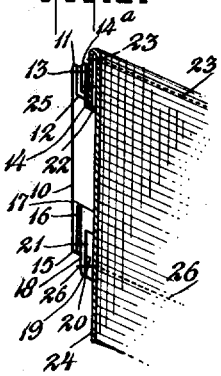
Figure 3:
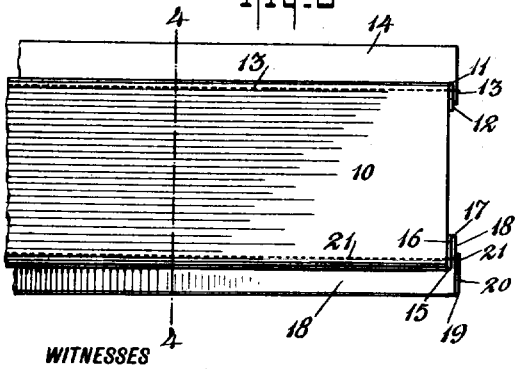
Figure 4:
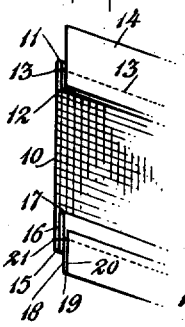
Figure 5:
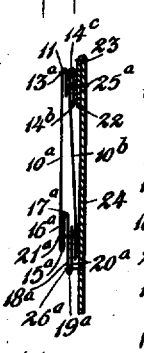
Figure 6:
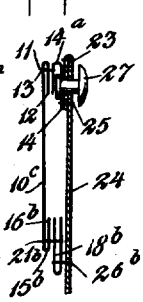

Figure 1 is a perspective view of a pair of knee trousers with my invention incorporated therein; Fig. 2 is an enlarged detail section on the line 2—2 of Fig. 1; Fig. 3 is an enlarged face view of a portion of the curtain before it is attached to the garment; Fig. 4 is a section thereof on the line 4—4 of Fig. 3; Figs. 5 and 6 are similar views of two additional forms of my improvement.

Referring to the form of my invention illustrated in Figs. 2, 3 and 4 the improved curtain comprises a main or body portion or curtain section 10 forming a rectangular panel of imperforate fabric having the desired width and length and having its one edge turned or folded over as indicated at 11 to form a hem 12. A row of stitches or seam 13 extends from end to end of the main section along and preferably in close proximity to and at a uniform distance from the fold or bend 11 and serves to secure said hem 12 in its folded position. This row of stitches 13 also passes through a flap or top attaching fabric portion 14 which when the curtain is free from the garment extends beyond the fold 11. The said flap or attaching portion is thus secured to the said body portion and serves as a means through the medium of which one portion of the curtain is attached to the garment as will be more fully explained hereinafter. At the edge opposite to that at which the flap 14 is located the body portion is folded inward as indicated at 15 to form the fold 16 and then back again as indicated at 17 to form the fold 18 or bottom attaching fabric portion after which the free edge is turned or folded in at 19 to form the hem 20 and bottom line of the curtain. A row of stitches or bottom seam 21 extends along from end to end of the main section 10 and preferably closely adjacent to end at a uniform distance from the edge formed by the bend 15 and passes at least through the body 10, the fold 16 and the fold 18 to secure these parts in their folded condition and preferably should also extend through the hem 20 as clearly shown in Fig. 2 although this latter is not absolutely necessary. It will be seen from an inspection of Figs. 3 and 4 that the folded portion 18 extends beyond the bend 15 so that with this construction the bend 15 forms a bead or ridge extending along the exposed surface of the fold 18.

In all garments into which curtains of this description are to be incorporated the upper edge is turned in to form a hem as indicated at 22 and sewed as shown at 23, the stitches 23 being preferably located in close proximity to the folded upper edge of said garment, thus leaving a considerable portion of the hem 22 free from the body of the garment 24. When it is desired to attach a curtain of the kind so far described the free portion of the edge 22 and the normally exposed portion of the flap 14 are brought into contact with each other and sewed together by means of stitches 25 which preferably pass only through the free portion of the hem 22 but may, in addition if desired also pass through the body of the garment itself. During the attaching operation the body 10 of the curtain will project beyond the upper edge of the garment so as to leave the normally exposed portion of the flap 14 free to receive the stitches 25 which need not be carefully manipulated so far as a straight line is concerned. After the flap or top attaching portion 14 has thus been secured in position, the body portion 10 is folded down to the position shown in Fig. 2, the flap or top attaching portion being bent or folded at $14^a$ at the point where the stitches 13 are located, said flap being concealed through this folding over of the body portion 10 as described.

Continuing the description of the preferred form as shown in Figs. 2, 3 and 4 the row of stitches 13 having been carefully applied to the curtain during its manufacture extends substantially in a straight or other predetermined line from end to end of the main section and thus provides a definite folding line on which the said top attaching portion is folded irrespective of irregularities in the stitching by which said top portion is attached to the garment and therefore insures a regular and even folding or turning over of the curtain at this point. After the body 10 has been folded over the flap 14 as described the exposed portion of the fold 18 is attached to the garment 24 by one or more rows of machine stitching 26, which pass through the fold 18, the hem 20 and the garment 24. During this latter sewing operation as the material is fed along the bend 15 forming the ridge before mentioned is maintained in contact with the presser foot of the sewing machine and thus forms a guide for said presser foot and consequently for the stitching 26. A regular, even line of stitching is thus secured at this point and a finished appearance given to the garment and the curtain at all parts, a result which it has heretofore been impossible to obtain without a maximum of time and expense. It will be noted that if the row of stitches 21 has not been passed through the hem 20, that this hem is first formed by turning the material inward before the sewing 26 is attempted so that in this case the hem 20 will be maintained in position by the stitches 26. In the form of curtain so far described a single material having a certain amount of body or rigidity as for instance drill is used in manufacturing the entire curtain.

In many cases it will be desirable to give a finer appearance or finish to the garment than is obtained with the use of drill or a similar material. In such cases the form of curtain shown in Fig. 5 is substituted in which the exposed portions of the curtain comprise a material of finer grade and appearance than drill or the like but without the body and rigidity necessary to secure the desired results. This form of curtain comprises a body or main curtain section $10^a$ formed for instance of imperforate sateen or the like and having its upper edge hemmed and secured by means of stitches $13^a$ to a backing of drill or other relatively stiff material $10^b$. The backing $10^b$ is secured to the body $10^a$ by the stitches $13^a$ so that a portion of said backing extends beyond the body and forms a flap $14^b$ corresponding to the flap 14 heretofore described. The body $10^a$ in this instance is also folded in one direction at $15^a$ to form the fold $16^a$ and then back again at $17^a$ to form the fold $18^a$ after which the free edge of the body is turned in at $19^a$ to form the hem $20^a$ all in the same manner as in the first form of my invention. in this latter form now being described a row of stitches $21^a$ corresponding to the stitches 21 passes through the body $10^a$, and the folds $16^a$, $18^a$ and the hem $20^a$ and secures these portions in their folded condition and further extends through the backing $10^b$ to secure the lower portion of said backing to the body portion as shown in Fig. 5. In this form the curtain is first attached to the garment in the same way as in the first form described, that is by stitches $25^a$ which secure the flap $14^b$ to the hemmed portion 22 of the garment, after which the backing $10^b$ is bent or folded at $14^c$ so that it covers the flap $14^a$ and its stitches and the body $10^a$ extends parallel with said backing. At its opposite portion the curtain is fastened by means of stitches $26^a$ which pass through the exposed portion of the fold $18^a$ and through the hem $20^a$ and garment 24, the ridge formed by the bend $15^a$ in this case also forming a guide for the presser foot and for the stitches $26^a$ in the same manner as in the first form of my improvement. While I have shown the backing $10^b$ as terminating short of the stitches $26^a$ it is to be understood that said backing may extend far enough so that said stitches $26^a$ in addition to passing through the body $10^a$, fold $18^a$ and hem $20^a$ will also pass through the backing $10^b$.

It will be seen that when this form of curtain is in position on the garment the only portions thereof which are exposed are composed of the better grade of material as for instance sateen so that a better appearing finish results, while the necessary stiffness and rigidity is secured through the medium of the now invisible backing $10^b$ of drill or other relatively stiff material.

In many instances the garment in which the curtain is to be incorporated is composed of a soft and easily distorted or stretched material such as serge or other fabric having a loose weave, so that in order to secure the best construction the curtain should preferably be constructed to adapt itself to the fabric without losing any of the other characteristics, such as comparative rigidity, necessary to obtain the desired results. For this purpose the form of curtain illustrated in Fig. 6 may be used to advantage and which comprises the body portion or main curtain section $10^c$ of drill or similar relatively rigid material having its upper portion formed for instance in the same way as the form shown in Fig. 2 and connected to the garment in the same manner. The lower edge of the body $10^c$ is turned in at $15^b$ to form the hem $16^b$ and is secured by means of stitches $21^b$ to a strip of fabric $18^b$ preferably doubled on itself and extending beyond the bend $15^b$. This strip $18^b$ is composed of fabric having more or less the same characteristics as the fabric of which the garment is made and is secured to said garment by means of stitches $26^b$, the bend $15^b$ serving as a guide for the sewing in the same way as hereinbefore described. Thus any distortion or stretching of the garment will be taken up by this strip $18^b$ and any distortion or stretching relatively to the curtain is avoided so that a smooth and neat finish without puckerings or folds is secured.

It is to be understood that the portions 18 and 20 of Fig. 2 and $18^a$ and $20^a$ of Fig. 5 may be made of a strip of material doubled on itself and separate from the body 10 or $10^a$ in the same way as is the strip of fabric $18^b$ in Fig. 6. In this case the stitches 21 and $21^a$ serve to unite this separate strip of material to the body. It is also to be understood that the fabric forming the flaps 14 need not be pieces of fabric which are separate from the bodies 10 or $10^c$ but may be made integral therewith. In this case the body would be folded to provide this flap and would consequently have another bend at the points adjacent to the present opposed edges of the body 10 or $10^c$ and the flap 14.

If buttons for the accommodation of suspenders are included in the garment, these buttons 27, which are usually in the nature of mechanically secured buttons, may have their shanks pass entirely through the garment 24, and the parts indicated as 22, 14, 12 and 10 in Fig. 1 or through the correspondings parts of the structure shown in Fig. 5, so that the backs of the buttons will be visible on the inside of the garment as shown in Fig. 1. In high grade garments it may be found desirable to render the backs of said buttons invisible in which case the shanks thereof would pass only through the garment 24, the part 22 and one fold of the part 14 as shown in Fig. 6. In this case the backs of the buttons will be inserted in position just after the flap 14 or $14^b$ has been attached and before the body 10 or $10^a$ has been turned or folded down. In either case a firm and strong foundation for the buttons is secured and ripping out thereof or other mutilation of the garment is prevented.

The guiding of the presser foot is accomplished in the usual way by the fact that the edge of a permanently creased bottom fold of the panel of the curtain gives the direction of the seam. This bead or edge may, where the lower garment attaching seam passes through a supplemental part of the curtain other than the panel itself (as in Fig 2), serve as a physical abutment for the presser foot although this edge even then may simply serve as a guide for the eye of the operator and manifestly such is the action where the lower garment attaching seam is the same as the one which passes directly through the lower edge of the panel of the curtain, as for example when the seam 21 of Fig. 4 is run after the upper part of the curtain is already attached to the trousers.

My improvements thus provide curtains for knee trousers which may be readily manufactured, in any desired quantity and length, in a finished form capable of immediate and ready attachment to the garment and which give to the garment the desired finish. My improved curtains may in consequence of their construction be applied to garments by unskilled labor with the same result as has heretofore been secured only with skilled and relatively expensive labor.

Various changes in the specific forms shown and described may be made within the scope of the claims without departing from the spirit of my invention.

I claim:

1. A curtain for knee trousers comprising a main or curtain section consisting of a fabric portion folded upon itself along both top and bottom edges to form a rectangular imperforate panel, a top garment-attaching fabric portion united to said main section by a seam extending from end to end of the main portion in a straight line, the stitches passing through the fold of the main section near the bend therein and at a uniform distance throughout from the line defined by said bend, the said seam acting as a definite line upon which the top attaching portion is folded irrespective of irregularities in the stitching by which the said top portion is fastened to the garment, a bottom garment-attaching fabric portion permanently folded upon itself, the fold being the bottom line of the curtain and parallel with the top seam, and a bottom seam passing through the said garment-attaching portion and through the bottom edge fold of the panel in a straight line extending from end to end of the main section at a uniform distance from the line of said bend whereby a bead is formed to act as a guide for stitches parallel with said bend to unite the lower part of the curtain with the garment.

2. A curtain for knee trousers comprising a main or curtain section consisting of a fabric portion folded upon itself along both top and bottom edges to form a rectangular imperforate panel having permanent folded edges extending in parallel straight lines from end to end of the curtain, a top garment-attaching fabric portion, and, passing therethrough as well as through said main section, a seam extending from end to end of the main section in a straight line, the stitches passing through the fold of the main section near the bend therein and at a uniform distance throughout from the line defined by said bend, the said seam acting as a definite line upon which the top attaching portion is folded irrespective of irregularities in the stitching by which the said top portion is fastened to the garment, and a seam for attaching the lower part of the curtain to the trousers, said seam being parallel to the edge of the lower fold of the main section.

In testimony whereof I have hereunto set my hand in the presence of two subscribing witnesses.

JULIUS SCHWARZ.

Witnesses:
JOHN A. KEHLENBECK,
FRITZ ZIEGLER, JR.

Copies of this patent may be obtained for five cents each, by addressing the "Commissioner of Patents, Washington, D. C."